United States Patent [19]

Plummer

[11] 4,386,461

[45] Jun. 7, 1983

[54] RIBBON CABLE CONNECTOR TOOL

[75] Inventor: Robert E. Plummer, Independence, Kans.

[73] Assignee: ARCO Pipe Line Company, Independence, Kans.

[21] Appl. No.: 316,249

[22] Filed: Oct. 29, 1981

[51] Int. Cl.³ .................................... B23P 19/00

[52] U.S. Cl. .................................... 29/749; 29/751; 29/753; 29/758; 81/420; 81/425 R

[58] Field of Search .................... 29/749, 753, 751, 758, 29/760, 861; 81/418, 420, 421, 422, 423, 424, 425 R, 425 A, 426

[56] References Cited

U.S. PATENT DOCUMENTS

| | | | |
|---|---|---|---|
| 3,956,811 | 5/1976 | Munshower | 29/753 |
| 4,005,516 | 2/1977 | Bakermans | 29/749 |
| 4,041,740 | 8/1977 | Villazon | 81/418 |
| 4,164,812 | 8/1979 | Dragisic | 29/749 |
| 4,194,276 | 3/1980 | Grubb | 29/749 |

*Primary Examiner*—Carl E. Hall
*Assistant Examiner*—P. W. Echols
*Attorney, Agent, or Firm*—Frank J. Uxa

[57] ABSTRACT

An apparatus adapted to join an insulated cable having an electrically conductive wire therein and a connector, having a cover and a body, the body having an electrically conductive element capable of piercing the insulation of the cable and being in electrical communication with the wire therein when the cable is joined to the connector, the cover and the body being capable of being secured together in such a manner as to hold the ribbon cable therebetween, the apparatus comprising, in combination:

a loading die adapted to receive and to hold in spaced relation the cover, the body, and the cable, the loading die having positioning element associated therewith, the positioning element adapted to restrict the movement of the cover and the body in the loading die;

a compression die associated with the loading die and capable of being moved relative to the loading die, and coming into pressure engagement with the body and the cover; and pressure applying component associated with the loading die and the compression die and acting to cause the movement of the compression die relative to the loading die, whereupon pressure is exerted on the cover and the body.

13 Claims, 6 Drawing Figures

FIG. 4
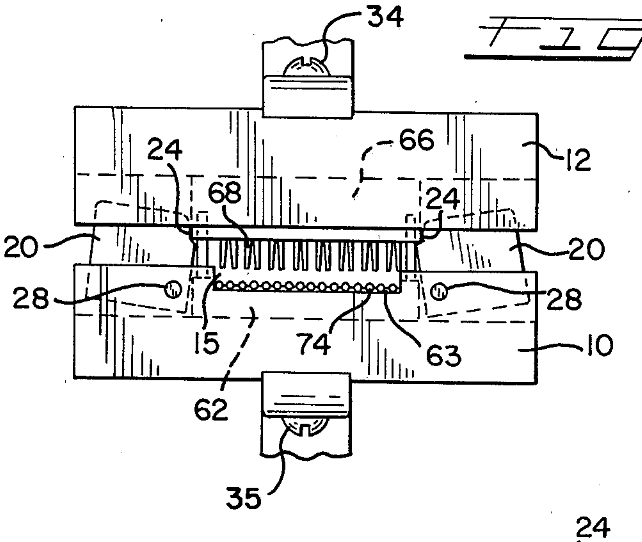
FIG. 5
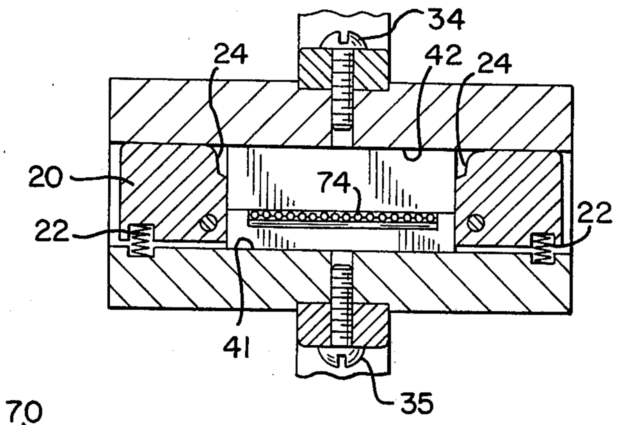
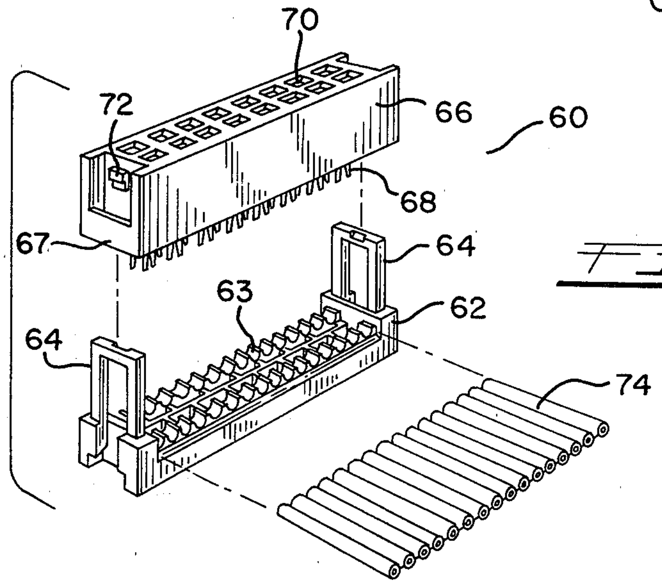
FIG. 6

RIBBON CABLE CONNECTOR TOOL

BACKGROUND OF THE INVENTION

The present invention relates to the assembly of mass termination connectors to ribbon cable, and more particularly to an improved tool for assembling mass termination connectors to ribbon cable.

Ribbon cable, consisting of a plurality of individually insulated electrically conductive wires attached to one another substantially in a plane through the use of a cohesive substance, such as plastic, has been known and used in the electronics industry for some time. The advantages in the use of ribbon cable are well-known and include a reduction of installation cost, ease of repair, and an increase in reliability. The use of ribbon cable is increasing in many industries. Ribbon cable comes in many different sizes, including 10-wire cable, 12-wire cable, 14-wire cable, 16-wire cable, 20-wire cable, and many more.

The use of ribbon cable is facilitated when mass termination connectors, such as plugs, sockets, and other types of connectors, are used. Mass termination connectors provide one electrical contact for each wire of the ribbon. Thus, a male mass termination plug for a 16-wire ribbon cable has 16 discrete male "pins," or electrical contacts, each corresponding to one of the 16 individual wires in the ribbon cable. Such a 16-pin plug would fit into a mating 16-hole female mass termination socket, itself connected to either another ribbon cable or into an electrical component or device.

The use of ribbon cable and mass termination connectors allows the connection and disconnection of multiple wires in a single operation. It also allows a quick check of multiple electrical connections through the inspection of a single connector.

The construction and configuration of mass termination connectors varies, and many different types are known. Typically, however, mass termination connectors have two parts: a body and a cover. The body includes a plurality of electrical prongs, each designed to pierce the insulation surrounding a single strand of wire in a multi-strand ribbon cable and to come into electrical contact with the conductive wire therein, without disturbing or contacting the adjacent strands of wire in the cable. The prongs are in electrical contact with the "pins" in a male connector or the "holes" in a female connector, thus providing the means through which the ribbon cable can function as an electrical conduit between a plurality of discrete points. The cover normally includes molded grooves, or depressions, to partially surround the strands of wire in the cable, thus holding the ribbon in a predetermined place. The cover also includes a latching means, or some other means, for securing and maintaining a tight fit with the body.

To secure a mass termination connector to a ribbon cable, the ribbon cable is properly aligned between the cover and the body, whereupon the cover and the body are brought together in alignment with sufficient pressure to force the prongs through the insulation and into electrical contact with the individual wires. The cover is securely fastened to the body, completing the assembly of the mass termination connector to the ribbon cable.

Because substantial pressure is required to force the prongs through the insulation, in most manufacturing processes the ribbon cable is pre-cut to the proper length and fastened to the mass termination connectors through the use of a bench press. Such bench presses usually are operated either manually or pneumatically.

One disadvantage with bench presses it that they can be used only where the mass termination connector can be assembled to the ribbon cable at a workbench. Where a connection needs to be made inside the cabinet of a device, or in some other relatively inaccessible place, it is not possible to use a bench press. Additionally, bench presses are relatively expensive tools that are cost-effective only where large quantities of assemblies are needed. As a consequence, a bench press is neither feasible nor practical where relatively few simple repairs or rewiring are taking place or where access to the work site is limited.

A few hand tools for assembling mass termination connectors to ribbon cable have been developed. Such tool are relatively expensive, and require visual monitoring of the assembly operation to ensure proper alignment of the cable between the connector body and the connector cover. Also, it is difficult with known hand tools to ensure that the proper amount of pressure is applied to the connector assembly.

Both bench presses and hand tools position the two parts of the connector on opposite sides of the ribbon cable and bring them into engagement with one another at sufficient pressure to cause the prongs of the connector body to pierce the insulation of the ribbon cable and come into electrical contact with the wires therein. With both types of tools it is important that the direction of relative movement of the two parts of the connector be in a precise, predetermined direction and that the parts be prevented from lateral movement or slippage, which could cause the piercing prongs to cut into adjacent insulation or come into contact with an adjacent wire. Also, with both types of tools it is important to apply sufficient pressure to ensure proper piercing of the insulation surrounding the several wires and proper fit of the connector body and cover, but not so much pressure as to impair the structural integrity of the connector itself, either through crushing or cracking.

SUMMARY OF THE INVENTION

The present invention eliminates these disadvantages associated with the prior art devices by providing an improved tool for the assembly of mass termination connectors to ribbon cable. The tool of the present invention includes a loading die that positions and holds the connector cover and the connector body, providing a predetermined space therebetween through which the ribbon cable may be inserted. The ribbon cable is placed in positive alignment when fully inserted through a notch in the front face of the loading die and squarely abutted against the rear face thereof. Positioning means associated with the loading die, preferably pivotable jaws mounted in the loading die, prevent movement, e.g., lateral movement, of the parts In a preferred embodiment, e.g., when the positioning means comprises pivotable jaws, the positioning means also acts to maintain the connector body, and consequently its electrical prongs, at a fixed vertical distance from the connector cover. A compression die also is provided, and the loading die and compression die are made to move in relation to each other. The movement of the compression die relatively closer to the loading die exerts a pressure on the connector body. As the compression die applies force to the connector body, the latter moves relatively closer to the connector cover causing the two to become secured to each other and causing the prongs to pierce the ribbon cable and contact the wires inside. The compression die and the loading die are constructed so as to prevent application of too much pressure on the connector parts. In a preferred embodiment, e.g., when the positioning means comprises pivotable jaws, the movement of the compression die relatively closer to the loading die exerts a pressure on the connector body which pressure frees the connector body from the resistive action of the positioning means, e.g., jaws, maintaining it at a fixed vertical distance from the connector cover, while maintaining the positioning means, e.g., jaws, in position to prevent lateral movement of the connector body and cover.

The relative movement of the loading and compression dies and consequent application of pressure on the connector cover and the connector body may be accomplished through the use of any suitable device, including mounting the loading and compression dies in a bench press or removably securing them to opposable pincers of a conventional hand tool, such as locking pliers, e.g., of the type commonly sold under the trademark Vise Grip. As can be seen, the loading and compression dies that are a part of the present invention can be combined with a standard, conventional hand tool, such as a locking pliers, which can be easily and simply modified by a user in the field to receive the dies, thus constructing the present invention. Different sized mass termination connectors may be attached to the appropriate sized ribbon cable through the use of matching loading dies, which may be removably secured to and interchangeably used with whatever pressure applying device is used. This feature allows an operator to us a single pressure applying device with a set of loading dies of various sizes to secure mass termination connectors of various sizes to ribbon cable.

A preferred embodiment of the present invention incorporates these features in a lighweight, inexpensive hand tool, especially adapted for use in locations where space is limited and the assembly operation cannot be visually observed.

Thus it is an object of the present invention to provide an improved tool for the assembly of mass termination connecters to ribbon cable.

It is another object of the present invention to provide a lightweight and inexpensive hand tool that is easy to use and that provides reliable, consistent terminal connections.

It is a further object of the present invention to provide a ribbon cable connector tool that prevents the application of too much pressure on the connector parts while allowing sufficient pressure to ensure a positive engagement of the electrically-conductive prongs within the wires.

An additional object of the present inventon is to provide a tool that can be used reliably where visual monitoring of the assembly operation is not possible.

It is yet a further object of the present invention to provide a tool that can be simply constructed by combining readily available, inexpensive locking pliers, with the loading and compression dies described herein.

Another object of the present invention is to provide a tool that can accommodate dies of different sizes adapted to secured various-sized mass termination connectors to corresponding sized ribbon cable.

These and other objects of the present invention are more fully described in connection with the drawings and description that follow.

BRIEF DESCRIPTION OF THE DRAWINGS

FIG. 4 is a detailed front view of the present invention showing in phantom lines the position of the connector cover and body as they are loaded into the tool ready to receive the ribbon cable, and the means by which the jaws position and hold the connector body relative to the connector cover;

FIG. 5 is a sectional view taken along line 5—5 of FIG. 3; showing the tool in the fully closed, or compressed, position; and FIG. 6 is an exploded detail view of a mass termination connector and a ribbon cable.

DESCRIPTION OF THE PREFERRED EMBODIMENT

Figure 1:
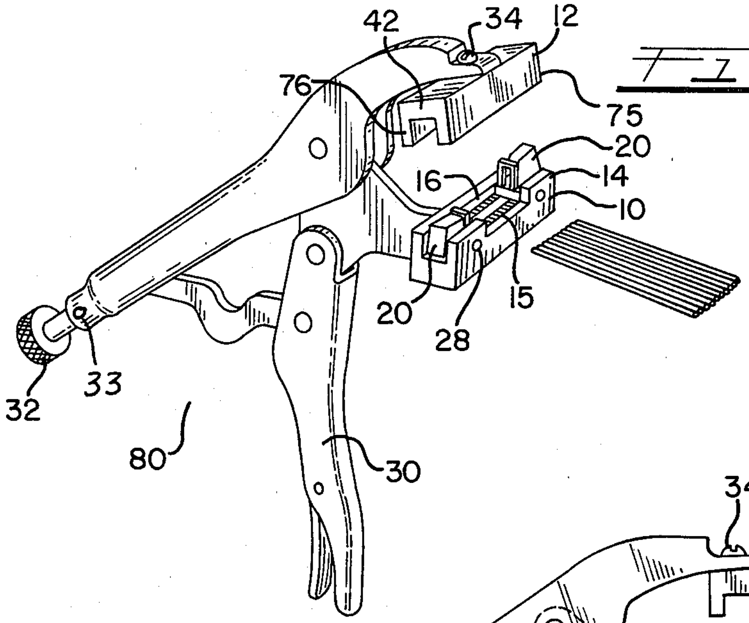
FIG. 1 is a perspective drawing of a hand tool incorporating one embodiment of the present invention and showing the connector cover loaded into the loading die and a portion of ribbon cable in position to be inserted therein.
Figure 2:
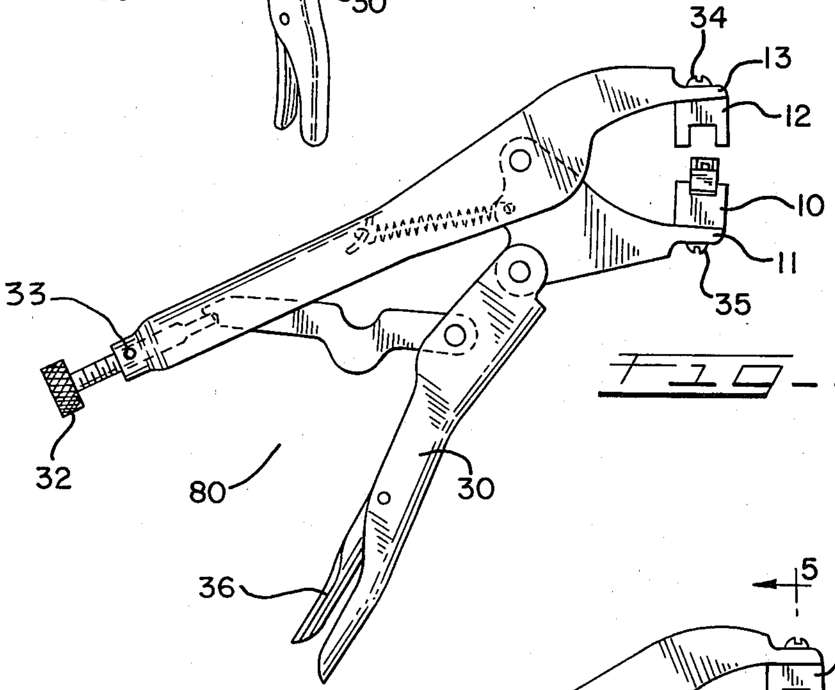
FIG. 2 is a side view of the tool shown in FIG. 1, also showing the connector body loaded therein.
Figure 3:
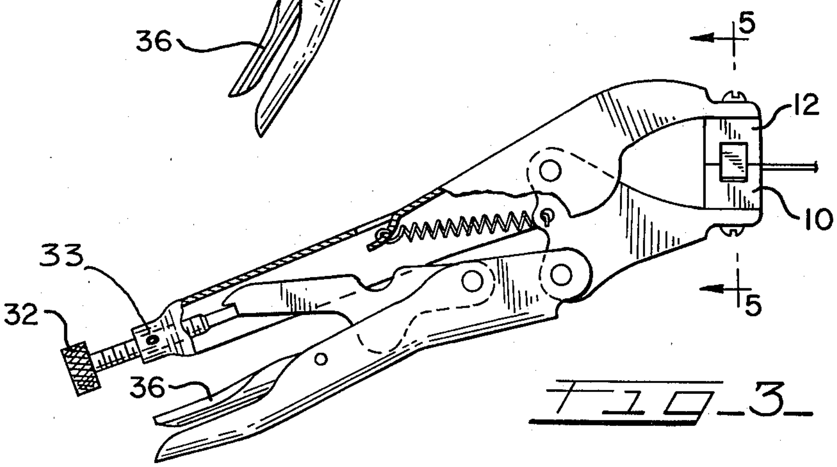
FIG. 3 is a side view of the hand tool in the fully closed, or compressed, position.

The embodiment of the present invention, shown in FIGS. 1–5, is a tool for assembling mass termination connectors to ribbon cable. A typical mass termination connector 60 is illustrated in FIG. 6. It includes a cover 62 and a body 66. Normally, both parts are formed of plastic. Cover 62 typically has grooves 63 formed therein for positioning the individual strands of the ribbon cable 74. The number of grooves 63 corresponds to the number of strands forming the ribbon cable 74 being utilized. The cover 62 also usually includes means for securing itself to the connector body 66, such as ears 64 which snap over latch means 72 formed on body 66. Body 66 includes electrically conductive prongs 68, which pierce the insulation surrounding the individual wires comprising the ribbon cable 74 and which come into contact with the wires contained therein. Corresponding to each prong 68 of the female connector body 66 is a socket 70 or other such device which provides the conduit by which the completed assembly may be connected to a complementary connector or another electrical component.

The embodiment of the tool of the present invention shown includes in combination a loading die 10, a compression die 12, and a pressure applying means 80, such as the locking pliers shown. Loading die 10 and compression die 12 are movable relative to each other, as for example, being removably secured to the opposing pincers 11 and 13 of the locking pliers shown in FIG. 1. It is to be understood, however, that the dies could also be used in combination in a bench press or in any other suitable tool.

Loading die 10 is formed substantially as a U-shaped channel, having a front wall 14, a rear wall 16, and a floor 41. There is provided in the front wall 14 a notch 15, adapted to receive ribbon cable 74.

The loading die includes means for positioning the connector cover 62 and body 66. In the preferred embodiment best shown in FIGS. 4 and 5, such positioning means comprise two oppositely spaced pivotally mounted jaws 20 on the loading die for positioning and holding the connector cover 62 and body 66. Jaws 20 pivot parallel to the longitudinal axis of the U-shaped channel about pivot pin 28 mounted transverse to the longitudinal axis of the U-shaped channel. As shown in FIG. 4, each jaw 20 is biased, such as through the use of spring 22, so as to tend to pivot towards the center of the loading die 10.

Each jaw 20 is provided with a stop 24 formed in the side therein. Each stop 24 and pivot pin 28 are positioned such that when each jaw 20 pivots toward the center of the loading die 10 the stop 24 moves relatively closer to the center of the loading die 10. When each jaw 20 is pivoted away from the center of the loading die 10, such as when spring 22 is compressed, stop 24 moves slightly relatively further away from the center of the loading die 10, as shown in FIG. 5.

Compression die 12 also is in the form of a U-shaped channel, having front wall 75, a rear wall 76 and a floor 42. In practice, both loading die 10 and compression die 12 may be cut from a common extrusion. When mounted in place, either in a bench press or in a hand tool as shown in FIGS. 1 through 5, floors 41 and 42 of the loading die 10 and the compression die 12 respectively face each other.

The use of the embodiment of the present invention shown, connector cover 62 is inserted into loading die 10 between jaws 20 and brought to rest on the floor 41 of the U-shaped channel. Cover 62 is inserted into the tool such that grooves 63 lie adjacent to notch 15 in the front wall 14 of loading die 10. The connector body 66 is then loaded into the loading die 10 such that the side walls 67 of body 66 rest upon stops 24 of jaws 20. In this position, body 66 is prevented from vertical movement toward cover 62 by engagement with stops 24, while jaws 20 prevent lateral movement of either body 66 or cover 62. Stops 24 on jaws 20 are so formed therein so that when body 66 is also in this position, prongs 68 are suspended above grooves 63 of cover 62 sufficiently to permit insertion of ribbon cable 74 through notch 15 without contacting prongs 68. The ribbon cable 74 is squarely cut at its end with none of the insulation having been stripped therefrom. Ribbon cable 74 thereupon is inserted through notch 15 until it abuts against the rear wall 16 of loading die 10. In this position, the parts are ready to be fastened to one another. Compression die 12 and loading die 10 are moved relatively closer to each other through the use of any suitable pressure applying means until the floor 42 on compression die 12 comes into contact with the body 66. The resistence to further relative movement of the compression die 12 when it contacts body 66 can be overcome by the application of additional pressure, which when exerted on the body 66 causes the jaws 20 to pivot slightly away from the center of loading die 10, freeing the body 66 from the stops 24 and allowing it to move vertically toward cover 62. Relative movement of the loading die 10 and compression die 12 continues, causing prongs 68 to pierce ribbon cable 74, until the front wall 14 of loading die 10 contacts compression die 12.

The shape of the dies 10 and 12 and the depth of the U-shaped channels therein are matched with the particular mass termination connectors 60 to be used so that when loading die 10 and compression die 12 are in contact with one another, the proper amount of relative movement of the connector body 66 and cover 62 has been achieved, and further relative movement is prevented. Further movement could impair the structural integrity of the mass termination connector 60 by cracking or crushing it.

When the pressure applying means used to move the loading die 10 relative to the compression die 12 is a hand tool, such as the locking pliers 80 shown, the completed tool is relatively small, lightweight, and simple to operate. Loading die 10 and compression die 12 preferably are mounted transverse to the longitudinal axis of the locking pliers 80 on the opposable pincers 11 and 13. The loaded tool can be used in situations that are inaccessible to a larger tool. Furthermore, because the construction of the dies 10 and 12 prevents the operator from putting too much pressure on the connector parts, visual observation of the assembly operation is not required. In such inaccessible location, the loaded tool can be brought to the location of the ribbon cable 74, which can be inserted through notch 15 until it abuts rear wall 16. Proper positioning of the ribbon cable 74 within the tool can be perceived by the operator through the feel of the ribbon cable 74 and the tool, whereupon the pincers 11 and 13 can be moved relative to each other through the use of handle 30.

As has been noted, different size dies 10 and 12 can be used for different types and sizes of mass termination connectors 60. Dies 10 and 12 are removably fastened to the pressure applying means by any suitable device, such as mounting screws 34 and 35.

Because dies 10 and 12 of various sizes may be interchangeably used in combination with the pressure applying means, an operator would need only one tool for applying pressure (such as the locking pliers 80 shown) and a set of dies 10, 12 to be able to assemble mass termination connectors and ribbon cable of various sizes. When used in combination with the locking pliers 80 shown, the dies 10 and 12 to be used may be first attached to opposing pincers 11 and 13, whereupon the relative movement of the pincers and the consequent relative movement of dies 10 and 12 may be adjusted through the use of adjusting screw 32. With this adjustment accomplished, set pin 33 is driven through adjusting screw 32 to lock the position of adjusting screw 32 in place. (Although it is preferred to use set pin 33 as indicated herein, adjusting screw 32 need not be permanently fixed. For example, different sizes of dies 10 and 12 may require different settings of adjusting screw 32 to provide the proper amount of pressure. The embodiment in which the position of adjusting screw 32 is adjustable is within the scope of the present invention.) With adjusting screw 32 so positioned, the tool may be used any number of times in the manner described, and when the proper amount of relative movement of loading die 10 and compression die 12 has been obtained, locking lever 36 of locking pliers 80 will close with a movement that can be both heard and felt, signaling the operator that the assembly has been completed. Depressing locking lever 36 will cause the locking pliers 80 to unlock, releasing the dies 10 and 12 from around the fastened termination connector 60 and allowing removal of the tool. Use of a locking pliers 80 in combination with dies 10 and 12 has the additional advantage that the completed tool can be readily assembled by an operator having dies 10 and 12 and purchasing a standard, conventional locking pliers 80, which with minor modifications can be adapted to receive dies 10 and 12.

While a single preferred embodiment has been described with reference to the drawings herein, it is to be understood that a number of embodiments are embraced by my invention. For example, the order of loading the parts of the unassembled mass termination connector 60 can be reversed, such that body 66 is loaded into the tool prior to the cover 62. Also, while the means for positioning the connector cover 62 and connector body 66 in the preferred embodiment comprises spring-biased, oppositely spaced, pivotally mounted jaws 20, other means can be used, such as stationary jaws that position and hold cover 62 and body 66 through the use of leaf springs mounted on the side thereof facing the center of loading die 10 and biased toward the center of loading die 10. All of these additional embodiments may be utilized without departing from the true scope and spirit of the invention.

While this invention has been described with respect to various specific examples and embodiments, it is to be understood that the invention is not limited thereto and that it can be variously practiced within the scope of the following claims.

The embodiments of this invention in which an exclusive property or privilege is claimed are defined as follows:

1. An apparatus for joining an insulated cable having an electrically conductive wire therein and a connector, having a cover and a body, said body having an electrically conductive element that pierces the insulation of said cable and being in electrical communication with said wire therein when said cable is joined to said connector, said cover and said body being secured together in such a manner as to hold said insulated cable therebetween, said apparatus comprising, in combination:

loading die for receiving and holding in spaced relation said cover, said body, and said cable, said loading die having positioning means associated therewith, said positioning means for restricting the movement of said cover and said body in said loading die;

a compression die associated with said loading die which moves relative to said loading die, and comes into pressure engagement with said body and said cover; and pressure applying means associated with said loading die and said compression die and acting to cause said movement of said compression die relative to said loading die, whereupon pressure is exerted on said cover and said body.

2. An apparatus for joining a ribbon cable having a plurality of separately insulated electrically conductive wires joined together in side-by-side arrangement substantially in the shape of a ribbon and a mass termination connector, having a cover and a body, said body having a plurality of electrically conductive elements that pierce the insulation in said ribbon cable and being in electrical communication with said wires therein when said ribbon cable is joined to said mass termination connector, said cover and said body being secured together in such a manner as to hold said ribbon cable therebetween, said apparatus comprising, in combination:

a loading die for receiving and holding in spaced relation said cover, said body, and said ribbon cable, said loading die having positioning means associated therewith, said positioning means for restricting the movement of said cover and said body in said loading die;

a compression die associated with said loading die which moves relative to said loading die and comes into pressure engagement with said body and said cover; and pressure applying means associated with said loading die and said compression die and acting to cause said movement of said compression die relative to said loading die, whereupon pressure is exerted on said cover and said body.

3. The apparatus of claim 2 wherein said apparatus is portable.

4. The apparatus of claim 3 wherein said pressure applying means comprises a locking pliers and wherein said loading die and said compression die are attached to opposing pincers thereof, said locking pliers for being squeezed to cause said movement of said compression die relative to said loading die.

5. The apparatus of claim 4, wherein said loading die and said compression die are attached to said pincers transverse to a longitudinal axis of said locking pliers.

6. The apparatus of claim 2 wherein said positioning means comprise jaws pivotally mounted within and transverse to a longitudinal axis of said loading die and wherein each of said jaws is spring biased toward the center of said loading die to hold the connector cover and body in place within loading die.

7. The apparatus of claim 6 wherein each of said jaws includes a stop on the side surface thereof closest the center of said loading die on which said connector body is placed prior to being secured to said connector cover, and wherein the relative movement of said compression die to said loading die, which acts to exert pressure on said connector body, is sufficient to pivot said jaws away from said connector body allowing said connector body to move beyond said stops and into secured relation with said connector cover.

8. The apparatus of claim 2 wherein said loading die and said compression die are removably secured to said pressuring applying means.

9. The apparatus of claim 2 wherein said pressure applying means is adjustable to provide the proper amount of relative movement of said loading die and said compression die to secure said connector cover to said connector body .

10. The apparatus of claim 2 wherein said loading die is a U-shaped channel having a front wall, a rear wall, and a floor therebetween.

11. The apparatus of claim 10 wherein said front wall has a notch therein for receiving said ribbon cable.

12. The apparatus of claim 10 wherein said compression die is a U-shaped channel having a front wall, a rear wall, and a floor therebetween and wherein said loading die and said compression die are formed from the same or identical dies.

13. An apparatus for joining a ribbon cable having a plurality of separately insulated electrically conductive wires joined together in side-by-side arrangement substantially in the shape of a ribbon and a mass termination connector, having a cover and a body, said body having a plurality of electrically conductive elements that pierce the insulation in said ribbon cable and being in electrical communication with said wires therein when said ribbon cable is joined to said mass termination connector, said cover and said body being secured together in such a manner as to hold said ribbon cable therebetween, said apparatus comprising in combination:

a loading die for receiving and holding in spaced relation said cover, said body, and said cable, said loading die being a U-shaped channel having a front wall, a rear wall, and a floor therebetween, said front wall having a notch therein for receiving said ribbon cable, said loading die having oppositely spaced, pivotally mounted jaws mounted within and transverse to a longitudinal axis of said loading die, each of said jaws being spring biased toward the center of said loading die, each of said jaws including a stop on the side surface thereof closest the center of said loading die;

a compression die associated with said loading die which moves relative to said loading die and comes into pressure engagement with said body and said cover, said compression die being a U-shaped channel having a front wall, a rear wall, and a floor therebetween; and locking pliers having opposing pincers, said loading and said compression die being removably secured to said pincers transverse to a longitudinal axis of said locking pliers.

* * * * *

UNITED STATES PATENT AND TRADEMARK OFFICE

CERTIFICATE OF CORRECTION

PATENT NO. : 4,386,461

DATED : June 7, 1983

INVENTOR(S) : Robert E. Plummer

It is certified that error appears in the above-identified patent and that said Letters Patent are hereby corrected as shown below:

Column 5, line 25; delete "The use of" and insert in place thereof ---To use---.

Claim 1, line 10; before the word "loading" insert the word ---a---.

Claim 6, line 6; after the word "within" insert the word ---said---.

Signed and Sealed this

*Ninth* Day of *August 1983*

[SEAL]

*Attest:*

GERALD J. MOSSINGHOFF

*Attesting Officer* *Commissioner of Patents and Trademarks*